United States Patent Office.

JAMES S. PEIRCE, OF PORTSMOUTH, NEW HAMPSHIRE.

ARTIFICIAL STONE.

SPECIFICATION forming part of Letters Patent No. 282,219, dated July 31, 1883.

Application filed May 3, 1883. (No specimens.)

*To all whom it may concern:*

Be it known that I, JAMES S. PEIRCE, a citizen of the United States, residing at Portsmouth, in the county of Rockingham and State of New Hampshire, have invented certain new and useful Improvements in Artificial Stone; and I do declare the following to be a full, clear, and exact description of the invention, such as will enable others skilled in the art to which it appertains to make and use the same.

My invention has for its object the production of an artificial stone suitable for building and paving purposes, possessing strength and hardness, and free from efflorescence when exposed to air; and it consists in the combination of ingredients, as hereinafter particularly described, and then sought to be specifically defined by the claims.

In preparing the composition I take of Portland or other good cement two parts, clean silicious sand, two parts, gravel, or rock broken into small pieces, two parts, and water thirty to forty parts. To the above I add of finely-powdered porcelain and calcined lime two parts each, and of silicate of soda one part. The materials, combined as specified, are thoroughly intermingled in any suitable vessel, by compression and agitation produced by any suitable stirrer and pounder, for a period sufficient to thoroughly lubricate the stone, sand, and gravel with the cementing ingredients, and to bring the particles into close, compact union, and are then formed into blocks in any suitable mold, and then letting them stand from three to five days till they are thoroughly set and hardened, during which time the stone may be wet with water several times a day without injury by ramming it compactly therein. Instead of forming it into blocks, the composition may be formed directly into walls or pavements, and any desired color may be given to it by the addition of the proper coloring-matter.

The composite stone may be applied to any of the uses made of stone and brick—such, for instance, as for building and paving purposes.

I have given the proportions of ingredients which I have found to give the best results; but variations therefrom not impairing the quality of the composition may be resorted to without departing from my invention, and instead of silicate of soda there may be employed silicate of potash.

By using lime and porcelain together in the composition the materials are set, hardened, and strengthened better than by the substitution of any other material for either, and by the addition of the silicate of soda to the porcelain and lime, and using it with the other ingredients or their equivalents, the composition is prevented from sweating, which would otherwise occur on exposure to the atmosphere, and it further prevents the absorption of moisture.

Having described my invention and set forth its merits, what I claim is—

1. An artificial stone having as ingredients powdered porcelain and calcined lime, as specified.

2. An artificial stone having as ingredients powdered porcelain, calcined lime, and silicate of soda or potash, as specified.

3. An artificial stone composed of cement, silicious sand, gravel, or broken stone, and calcined lime, powdered porcelain, and silicate of soda or potash, as specified.

In testimony whereof I affix my signature in presence of two witnesses.

JAMES STANDWOOD PEIRCE.

Witnesses:
CALVIN PAGE,
GEORGE W. PEIRCE.

It is hereby certified that in Letters Patent No. 282,219, granted July 31, 1883, to James S. Peirce, of Portsmouth, N. H., for an improvement in "Artificial Stone," errors appear in lines 34 and 38, of the printed specification forming a part of said patent, requiring correction, as follows: The words "by ramming it compactly therein" should be omitted after the word "injury," in line 38, and inserted after the word "mold," in line 34, and that the specification should be read with this correction therein to make it conform with the record of the case in the Patent Office.

Signed, countersigned, and sealed this 7th day of August, A. D. 1883.

[SEAL.]

M. L. JOSLYN,
*Acting Secretary of the Interior.*

Countersigned:

E. M. MARBLE,
*Commissioner of Patents.*